United States Patent [19]

Davis

[11] Patent Number: 4,490,162
[45] Date of Patent: Dec. 25, 1984

[54] LOW PRESSURE HEPA FILTRATION SYSTEM FOR PARTICULATE MATTER

[75] Inventor: Charles Davis, Mendham, N.J.
[73] Assignee: Aaxon Industrial, Inc., Iselin, N.J.
[21] Appl. No.: 451,191
[22] Filed: Dec. 20, 1982
[51] Int. Cl.³ .............................................. B01D 50/00
[52] U.S. Cl. ....................................... 55/213; 55/308;
55/315; 55/319; 55/324; 55/344; 55/350;
55/418; 55/484; 15/340; 15/352; 15/353
[58] Field of Search ...................... 55/1, 97, 213, 215,
55/308, 315, 319, 322–325, 334, 337, 343, 344,
350, 385 A, 417, 418, 430, 484, 494; 15/319,
326, 340, 347, 352, 353

[56] References Cited

U.S. PATENT DOCUMENTS

| 1,456,360 | 5/1923 | Budl | 55/494 |
| 2,880,819 | 4/1959 | King et al. | 55/213 |
| 3,149,940 | 9/1964 | Wächter | 55/324 |
| 3,780,502 | 12/1973 | Dupre et al. | 55/215 |
| 3,831,354 | 8/1974 | Bakke | 55/418 |
| 3,864,107 | 2/1975 | Baigas, Jr. | 55/337 |
| 3,955,236 | 5/1976 | Mekelburg | 55/319 |
| 4,111,670 | 9/1978 | DeMarco | 55/315 |
| 4,227,893 | 10/1980 | Shaddock | 55/1 |
| 4,277,266 | 7/1981 | Dick | 55/315 |

FOREIGN PATENT DOCUMENTS 801011 11/1950 Fed. Rep. of Germany ........ 55/418

Primary Examiner—David Lacey
Attorney, Agent, or Firm—Clifford G. Frayne

[57] ABSTRACT

An improved low pressure filtration apparatus for the collection and removal of particulate matter form an air stream which includes particulate matter wherein the apparatus includes sequentially, an intake hose for the introduction of the air stream including said particulate matter into the apparatus, a first enclosed collection chamber having an intake apparatus for connection to said intake hose and a removably secured outlet apparatus for removal of a portion of said particulate matter collected in said first collection chamber and an exit apparatus from the first collection chamber for the air stream and a portion of the particulate matter, a second enclosed collection chamber having an intake apparatus for introducing the air stream and a portion of the particulate matter from the first collection chamber, an exit apparatus for the air stream and a portion of the particulate matter from the second enclosed collection chamber, a plurality of vertically disposed filter bags disposed between the intake and exit apparatus of the second collection chamber for removal of a portion of the particulate matter, a cyclone separator having an intake apparatus in communication with the exit apparatus of the second enclosed collection chamber for the further removal of a portion of the particulate matter in the air stream, a micron filter screen in communication with the cyclone separator for the further removal of a portion of the particulate matter in the air stream, an air pump in communication with the micron filter screen for exhausting the air stream into the atmosphere, and a third enclosed collection chamber having an intake port in communication with the exit apparatus of the cyclone separator and an outlet port for the exit of the air stream from the third enclosed collection chamber to the micron filter.

10 Claims, 3 Drawing Figures

LOW PRESSURE HEPA FILTRATION SYSTEM FOR PARTICULATE MATTER

FIELD OF INVENTION

This invention relates to an all-purpose industrial and farm apparatus for the collection of particulate matter such as dust in grain elevators and in particular, hazardous and toxic particulate matter such as asbestos and the like.

BACKGROUND OF THE INVENTION

Vacuuming apparatus for particulate matter are well known in the prior art. Portable, heavy-duty vacuum collector apparatus are commonly used in industrial and other applications to collect wet and/or dry particulate materials. In a variety of industrial situations, the particulate matter to be collected may vary widely in particulate size and weight and in some cases even include liquids. Efficient removal of particulate matter is required for the efficient operation of any industrial process. In recent years, serious import has been given to the health and safety factors associates with particulate matter in industrial operations. Of particular concern has been the manufacture of asbestos related products, and the use of asbestos in the construction industry and the public's subsequent awareness of the hazards of asbestos to their health and safety.

As such, the asbestos industry has come under increasing attack and the public has become more and more aware of the use of asbestos in their environment. In order to protect the public, steps have been taken, including legislation, to remove asbestos from public areas. In addition, the dismantling of older industrial operations requires the removal of any asbestos used in the construction prior to the dismantling. Other hazardous materials which exist as a fine particulate are in many instances also required to be collected and the most efficient means for such collection is with a vacuum system. There are industrial vacuum systems in existence however they suffer from several drawbacks and the present invention offers solutions to these drawbacks and hence an improvement over the prior art. See U.S. Pat. Nos. 4,218,226; 4,111,670; 3,955,236; 3,842,461; 3,608,283.

The aforementioned patent utilize vacuum apparatuses mounted on vehicular bodies and use a variety of settling apparatus to collect and contain the particulate matter. However, one of the drawbacks of the aforementioned patents and not disclosed therein, is a means by which particulates can be removed from the incoming air with greater efficiency because of the relative particulate size of the particle and to further insure that the collection system will be airtight and not cause a leakage of particulate already removed should there be a break in the sealant of the system.

The present invention discloses a means for the collection of asbestos and other hazardous wastes and particulate matter under a low pressure system which prevents leakage to the outside atmosphere; and provides for the collection of particulate matter to a level of 0.3 microns. In addition, from the design of the stages of the disclosed apparatus herein, an efficient, steady state operation may be achieved with minimal maintenance by the operator and which system provides for the easy removal of the accumulated asbestos or other hazardous or particulate matter with less down time of the vehicle and therefore contributing to the cost efficiency of the vehicle.

OBJECT OF THE INVENTION

It is the primary objective of the present invention to provide an improved vacuuming apparatus which may be used for all-purpose industrial and farm use.

It is yet a further object of the present invention to provide an improved vacuuming apparatus which operates at low pressure and removes the possibility of particulate matter leakage to the atmosphere.

It is yet a further object of the present invention to provide an improved vacuuming apparatus for the collection and removal of hazardous and toxic particulate matter including but not limited to asbestos to a level well below that which would present a threat to an individual's health or safety.

It is still a further object of the present invention to provide an improved vacuuming apparatus in which the exhaust air is substantially free of all particulate matter thereby decreasing pollution and aiding in the enhancement of the environment providing such an apparatus and such a size such that a cost efficient operation is achieved.

SUMMARY OF THE INVENTION

In accordance with the present invention, there is an enclosed chamber with at least one inlet for the ingress of vacuumed air together with particulate matter wherein said heavier particulate matter settles in said chamber; and at least one outlet for the egress of air from said chamber to a filter bag arrangement wherein said airborne particulate matter of a certain size is removed from said air and settles to the bottom of said second chamber; a means for communication between said first chamber and said second chamber in order to accumulate said particulate matter in said first chamber; at least one exit for egress of said air and particulate matter from said second chamber to a cyclone precipitator; for the further settling of particulate matter; at least one egress for said cyclone precipitator to a third chamber, said third chamber containing a series of high efficiency particulate air filter units to remove the remaining particulate matter contained in said inlet air; and at least one exit from said third chamber for the egress of air to a micron screen for final filtering; and at least one exit from said micron screen chamber to a vacuum pump for egress of said air back to the atmosphere.

DETAILED DESCRIPTION OF THE DRAWINGS

Figure 1:
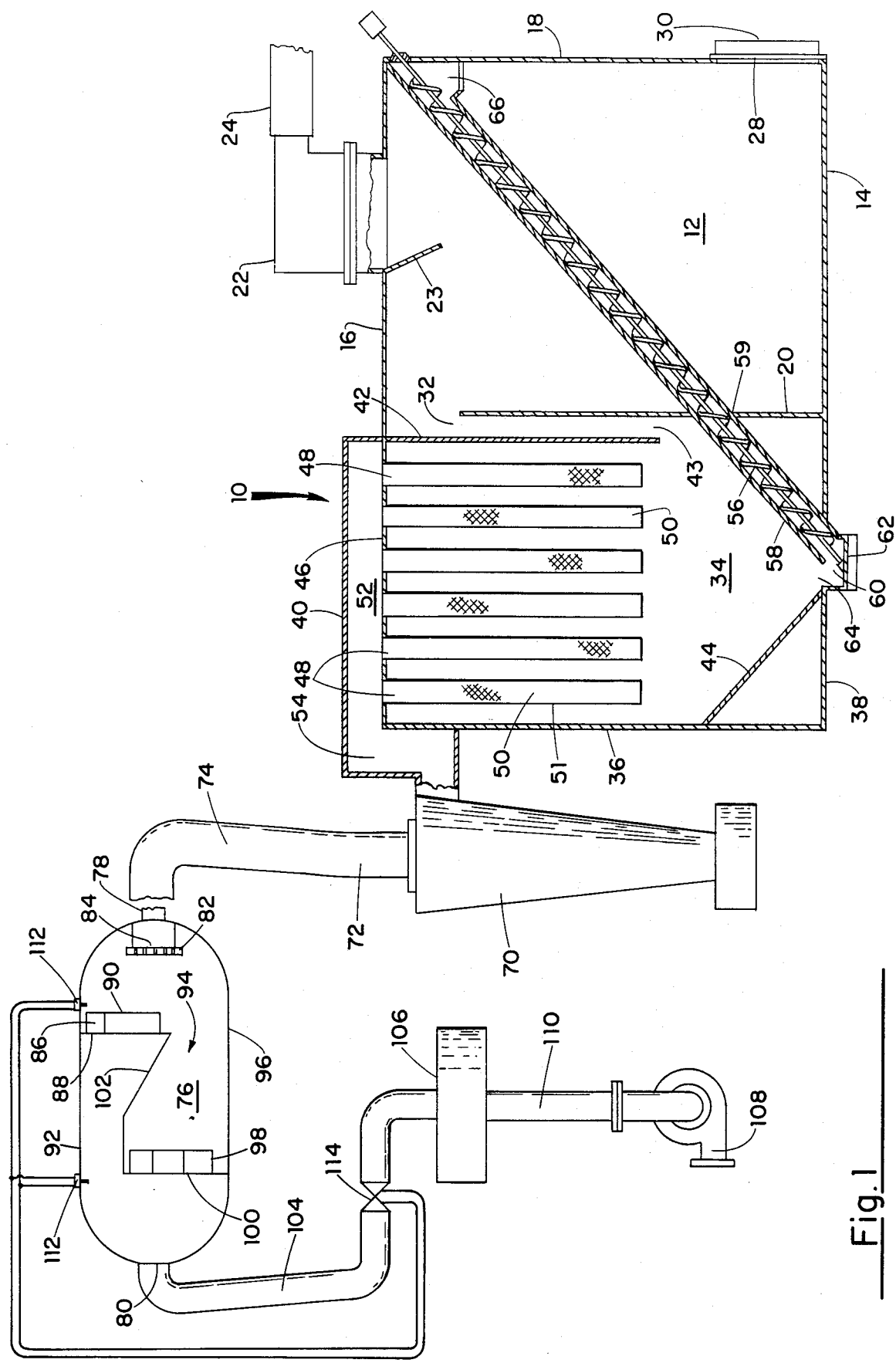
FIG. 1 discloses a cross-sectional view of the overall collection apparatus.

The low pressure collection system in a vacuum circuit is disclosed in FIG. 1 which discloses a flow diagram of the path taken by the air and particulate matter through the apparatus. Referring to FIG. 1, there is disclosed generally, a multi-stage waste particulate separator 10 comprising a first collection chamber 12 having a box-like configuration with a bottom 14, a top 16, an exterior rear wall 18 and an interior wall 20 and side walls. The first collection chamber is box-like in construction although other chamber configurations may be utilized, e.g., cylindrical without a departing from the spirit and scope of the invention. The first collection chamber 12 is constructed of reinforced steel or other suitable material and has displaced on top wall 16 thereof, an inlet opening 22. Inlet opening 22 is capable of swiveling 360° in a horizontal plane and 180° in a vertical plane and has connected thereto vacuum hose 24. Vacuum hose 24 may be of any convenient diameter based on the volume of flow through the hose. Additionally, the hose, which extends to the area from which particulate matter is to be removed may be divided into branches to permit several operators to vacuum simultaneously. Inlet 22 has associated therewith, baffle 23 for directing air flow through inlet 22 downwardly into first collection chamber 12.

There is displaced on exterior wall 18, an opening 28 having a removably secured cover 30 to permit the removal of particulate matter from first collection chamber 12 at the conclusion of its operation.

There is disposed on interior wall 20 of first collection chamber 12, an outlet opening 32 located proximate to top wall 16 of first collection chamber 12. In operation, air with particulate matter will be drawn into first collection chamber 12 by a vacuum pump as will be described, and heavier particulate matter will settle out from the air on the bottom wall 14 of first collection chamber 12, as a result of decreased velocity of the airstream upon entering collection chamber 12. The remaining air and particulate matter will be drawn through outlet opening 32 and into a second collection chamber 34. The second collection chamber 34 comprises a box-like structure defined by interior wall 20 of first collector chamber 12 an exterior forward wall 36, a bottom 38 and a top wall 40 and side walls.

The air and particulate matter drawn through outlet opening 32 of first collection chamber 12, is directed downwardly toward bottom wall 38 of second collection chamber 34 by a baffle 42 which extends vertically downwardly from top wall 40 thereby defining a passageway 43 between interior wall 20 and baffle 42. Second collection chamber 34 contains an inner bottom wall 44 which is conically inverted and centrally disposed.

Second collection chamber 34 also comprises an interior top wall 46 which interior top wall has disposed thereon a plurality of openings 48. There is disposed vertically downwardly from said plurality of openings 48, a plurality of filter bags 50 disposed about filter frames 51. Exterior top wall 40 and interior top wall 46 of second collection chamber 34 define a chamber 52 having an outlet 54 permitting the egress of air from second collection chamber 34. In operation, the air and particulate matter from first collection chamber 12 enters second collection chamber 34 by means of outlet opening 32 and said air and particulate matter is directed downwardly through passageway 43 toward the bottom of second collection chamber 34 by baffle 42 and then said air and particulate matter is drawn upwardly in second collection chamber 34 and is forced to pass through filter bags 50 in order to reach upper chamber 52 and egress through outlet 54 from second collection chamber 34. In this operation, particulate matter is collected on the exterior of the filter bags and falls under the operation of gravity or by reverse pressure to conical interior bottom wall 44 of second collection chamber 34.

The particulate matter which accumulates on conical interior bottom wall 44 of second collection chamber 34 is transported to first collection chamber 12 by means of an enclosed auger 56. Auger 56 is enclosed within cylinder 58 which enclosed cylinder 58 has an opening 60 at its first end 62 which is proximate to the apex 64 of inverted conical interior bottom wall 44. Auger 56 and enclosed cylinder 58 extend from apex 64 of conical interior bottom wall 44 of the second collection chamber through opening 59 in interior wall 20 to a point proximate to top wall 16 of first collection chamber 12 where said enclosed cylinder has a second opening 66 for the exit of particulate matter into first collection chamber 12. Auger 56 may be operated by an independent motor means or by a drive unit off of a vehicle on which the entire apparatus is placed as which will be more fully described.

In the above configuration, second collection chamber 34 could be continuously emptied of particulate matter and said particulate may be transferred to first collection chamber 12 where it is removed through exterior wall opening 28.

Air and particulate matter exiting through outlet 54 of second collection chamber 34 enters into a centrifugal separator 70, said centrifugal separator 70 identified commonly in the trade as a cyclone precipitator. Centrifugal separator 70 directs the airstream and particulate matter in a circular pattern such that the heavier particles and liquids, if any, drop from the airstream through the bottom end of the centrifugal separator 70 and the remaining lighter particles and air pass through upper opening 72 of the centrifugal separator and by means of duct 74 they are directed to third collection chamber 76. First chamber 12 and second chamber 34 serve as prefilter means to remove particulate matter such that the air stream entering third collection chamber 76 contains small particulate matter in the 5 micron range.

In the configuration shown in FIG. 1, third collection chamber 76 comprises a horizontally mounted cylinder, however, third collection chamber 76 may be of different configuration without departing from the spirit and scope of the invention. Third collection chamber 76 contains an inlet port 78 removably connected to duct 74 and an outlet port 80. Immediately upon entering third collection chamber 76, the air and particulate matter encounter a baffle 82 having a plurality of openings 84, said baffle 82 being disposed on the interior of third collection chamber 76 immediately across inlet port 78 so as to disrupt the flow of air and particulate matter into third collection chamber 76.

Disposed within third collection chamber 76 between inlet port 78 and outlet port 80 are a plurality of filter banks independently disposed. The first filter bank 86 is disposed proximate to inlet port 78 and comprises a vertically disposed baffle 88 on which are mounted a plurality of high efficiency particulate filters capable of filtering particulate matter in the 0.3 micron range from the air. Baffle 88 extends downwardly from top 92 of third collection chamber 76 but does not extend across the entire circumference of third collection chamber 76 but rather leaves a passageway 94 between baffle 88 and bottom 96 of third collection chamber 76. Passageway 94 permits incoming air through inlet port 78 to be divided between first filter bank 86 and to be directed downwardly through passageway 94 to a second filter bank 98 which filter bank comprises a baffle 100 extending upwardly from bottom 96 of third collection chamber 76 and on which are mounted a plurality of high efficiency particulate filters 90. Baffles 88 and 100 contain a plurality of openings to coincide with the positioning of high efficiency particulate filters 90 on each baffle. The top of baffle 100 and the bottom of baffle 88 are connected by baffle 102 which effectively divides third collection chamber 76 into two stages. Incoming air and particulate matter entering through inlet port 78 are directed by baffle 82 to either the first filter bank 86 or second filter bank 98 thus requiring the air and the particulate matter to pass through these filter banks and baffles 88 and 100 before entering that stage of third collection chamber 76 defined by baffles 88, 100, and 102. Once passing through first or second filter banks 86 and 98, air should be substantially filtered of all particulate matter and exits through outlet port 80.

Air and particulate matter exiting outlet port 80 are directed by duct 104 removably connected to outlet port 80 to a pulsing and screening chamber 106. Pulsing and screening chamber 106 comprises a 200 micron pulsation and screening chamber which has little filtering effect when used in conjunction with third collection chamber 76 containing high efficiency particulate filters 90 and 98. However, pulsing and screening chamber 106 does protect filters 90 and 98 from vibration and pulsing of vacuum pump 108 which is connected to pulsing and screening chamber 106 by duct 110 and which provides the vacuum which has transported the air and particulate matter through the system since its ingress into the system through inlet port 22 of first collection chamber 12.

Figure 2:
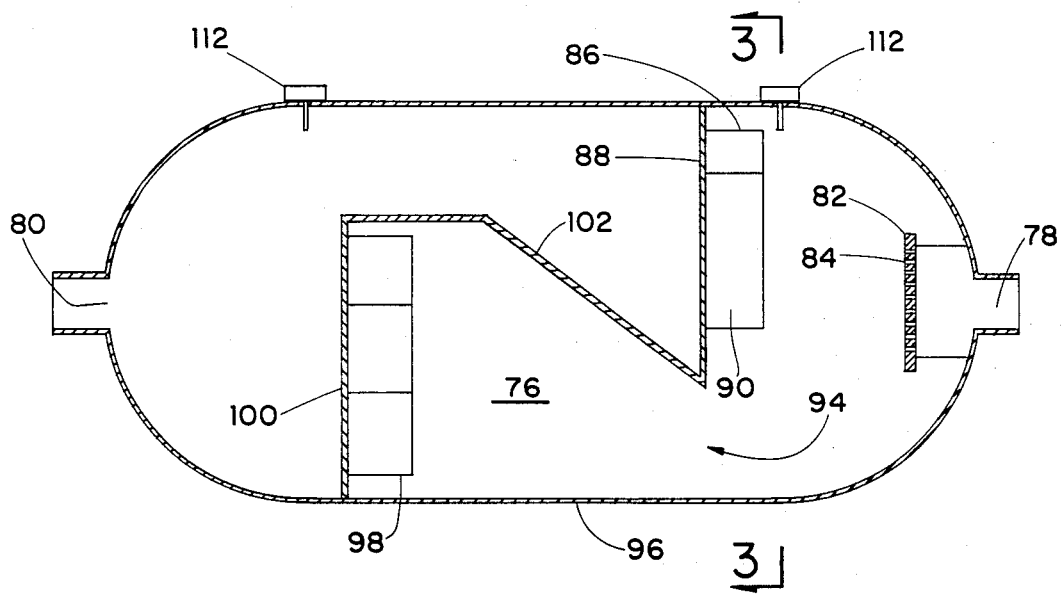
FIG. 2 discloses a cross-sectional view of the HEPA filter arrangement.
Figure 3:
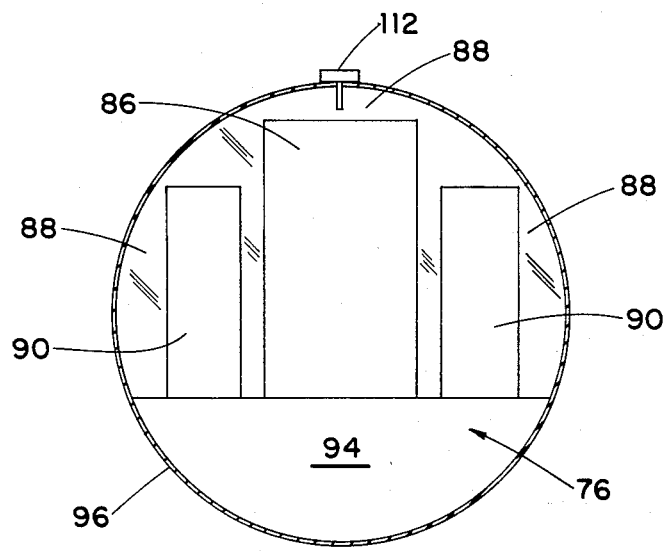
FIG. 3 is an end view of the HEPA filter arrangement.

FIG. 2 discloses a detailed cross sectional view of third collection chamber 76 and cross sectional views of filter banks 86 and 98. It will be noted by one skilled in the art that the configuration of filter banks 86 and 98 is an attempt to provide maximum surface area of high efficiency particulate filters to the direction of the air flow through a third collection chamber 76. FIG. 3 shows a typical configuration of first filter bank 86. It should also be noted that third collection chamber 76 as connected in series with first and second collection chambers 12 and 34, may be disengaged from the system such that air and particulate matter exiting centrifugal separator 70 may be directed directly to pulsing and screening chamber 106 if it is not desirable to filter the air and particulate matter to the level provided for by third collection chamber 76.

The third collection chamber is equipped with pressure differential gauges 112 so as to detect the pressure drop across the high efficiency particulate filters so as to gauge system performance. Third collection chamber 76 also has an automatic differential pressure transducer type automatic shutdown system which may be preset by the operator.

An additional safety feature to protect the system and insure maximum efficiency and to prevent leakage of particulate matter to the atmosphere is a control valve 114 located in duct 104 between third collection chamber 76 and pulsing screen 106. Control valve 114 is connected to differential gauges 112 and the automatic shutdown system such that when a preset pressure differential is reached across filter banks 86 and 98, the deisel engine of the vehicle on which the apparatus is mounted is automatically shut off and hence vacuum pump 108 is shut off. Additionally, control valve 114 would seal duct 104. As is the case sometimes with deisel engines, if it failed to shut down, damage, to the system is avoided with the closing of control valve 114 by the existence of one way bleeder valves in pulsing chamber 106 which would permit outside air to be drawn into the chamber but would prevent leakage to the atmosphere.

The disclosed invention, having vacuum pump 108 positioned at the end of the filtering cycle, establishes a vacuum system operating under low pressure throughout the system. In this configuration, any leakage which occurs would occur inwardly in the system. This is especially important then dealing with hazardous or toxic wastes in the nature of asbestos fiber in which removal and containment is the main objective.

As disclosed, the entire apparatus may be mounted on a truck body for transportation or the entire apparatus less the third collection chamber 76 may be mounted on a truck body and the third collection chamber 76 may be trailer mounted and utilized in the system when necessary.

I claim:

1. In an improved low pressure filtration apparatus for the collection and removal of particulate matter from an air stream including said particulate matter wherein said apparatus includes sequentially, an intake hose for the introduction of said air stream including said particulate matter into said apparatus, a first enclosed collection chamber having an intake means in flow connection with said intake hose and a removably secured outlet means for removal of a portion of said particulate matter collected in said first collection chamber and an exit means from said first collection chamber for said air stream and a portion of said particulate matter; a second enclosed collection chamber having an intake means for introducing said air stream and said portion of said particulate matter from said first collection chamber, an exit means for said air stream and a portion of said particulate matter from said second enclosed collection chamber; a plurality of vertically disposed filter bags disposed between said intake and exit means of said second collection chamber for removal of a portion of said particulate matter; a cyclone separator having an intake means in communication with said exit means of said second enclosed collection chamber for the further removal of a portion of said particulate matter in said air stream and an exit means; a micron filter screen in communication with said exit means of said cyclone separator for the further removal of a portion of said particulate matter in said air stream; an air pump in communication with said micron filter screen for exhausting said air stream into the atmosphere, the improvement of which comprises:

a third enclosed collection chamber having an intake port in communication with said exit means of said cyclone separator and an outlet port in communication with said micron filter screen for the exit of said air stream from said third enclosed collection chamber to said micron filter screen, said third enclosed collection chamber including a plurality of baffles mounted within said third collection chamber between said intake and outlet ports, substantially perpendicularly disposed to the direction of flow of said air stream and particulate matter, each of said substantially perpendicularly disposed baffles having an intake side and an outlet side from said intake to said outlet parts, each of said substantially perpendicularly disposed baffles having an area less than a cross sectional area of said third enclosed collection chamber and formed with a plurality of openings therethrough, a plurality of high efficiency particulate filters for removing particulate matter of a particle size greater than 0.3 microns mounted on said substantially perpendicularly disposed baffles, coincident with said plurality of openings; a baffle partition secured to said substantially perpendicularly disposed baffles and said third enclosed collection chamber to divide said third enclosed collection chamber into two chambers for directing said flow of said air stream partially through each of said plurality of high efficiency particulate filters mounted on said baffles; a baffle plate positioned proximate to said intake port and perpendicularly disposed to said direction of flow of said air stream so that said baffle reduces the velocity of said air stream and partially directs said air stream through each of said plurality of high efficiency particulate filters; and means for determining pressure drop across said plurality of high efficiency particulate filters.

2. The improved low pressure filtration apparatus as defined in claim 12 wherein said plurality of openings in said substantially perpendicularly disposed baffles are rectangularly shaped and said high efficiency particulate filters are mounted coincident with said openings.

3. The improved low pressure filtration apparatus as defined in claim 1 wherein said plurality of high efficiency particulate filters are mounted on said intake side of said substantially perpendicularly disposed baffles.

4. The improved low pressure filtration apparatus in accordance with claim 1 wherein said means for determining pressure drop across said plurality of high efficiency particulate filters comprise pressure gauges mounted on said third enclosed collection chamber on said intake port said and outlet port side of said baffles.

5. The improved low pressure filtration apparatus in accordance with claim 4 wherein said pressure gauges are connected to an automatic shut-off valve positioned proximate to said outlet port of said third collection chamber.

6. An apparatus for filtration of particulate matter of 0.3 microns or greater from an air stream including particulate matter which comprises an enclosed collection chamber having an intake port for the introduction of said air stream including particulate matter, an outlet port for the exiting of said air stream substantially free of particulate matter to the atmosphere, said enclosed collection chamber comprised of a plurality of baffles mounted within said collection chamber between said intake and outlet ports, substantially perpendicularly disposed to the direction of flow of said air stream and particulate matter, each of said substantially perpendicularly disposed baffles having an intake side and an outlet side from said intake to said outlet parts, each of said substantially perpendicularly disposed baffles having an area less than the cross sectional area of said enclosed collection chamber and formed with a plurality of openings therethrough; a plurality of high efficiency particulate filters for removing particulate matter of a particle size greater than 0.3 microns mounted on said substantially perpendicular disposed baffles, coincident with said plurality of openings; a baffle partition secured to said substantially perpendicularly disposed baffles and said enclosed collection chamber to divide said enclosed collection chamber into two chambers for directing said flow of said air stream and particulate matter partially through each of said plurality of high efficiency particulate filters mounted on said baffles; a baffle plate positioned proximate to said intake port and perpendicularly disposed to said direction of flow of said air stream, said baffle plate being positioned and arranged to reduce the velocity of said air stream and to partially direct said air stream through each of said plurality of high efficiency particulate filters; and means for determining pressure drop across said plurality of high efficiency particulate filters.

7. An apparatus in accordance with claim 6 wherein said plurality of openings in said substantially perpendicularly disposed baffles are rectangularly shaped and said high efficiency particulate filters are mounted coincident with said openings.

8. The apparatus in accordance with claim 6 wherein said plurality of high efficiency particulate filters are mounted on said intake side of said substantially perpendicularly disposed baffles.

9. The apparatus in accordance with claim 6 wherein said means for determining pressure drop across said plurality of high efficiency particulate filters comprise pressure gauges mounted on said enclosed collection chamber on said intake side and said outlet side of said baffles.

10. An apparatus in accordance with claim 9 wherein said pressure gauges are connected to an automatic shut-off valve positioned proximate to said outlet port of said enclosed collection chamber.

* * * * *